United States Patent [19]

Aoshima

[11] Patent Number: 5,729,780
[45] Date of Patent: Mar. 17, 1998

[54] CAMERA WITH MAGNETIC HEAD PREVENTED FROM CONTACTING FILM DURING IMAGE RECORDING

[75] Inventor: Chikara Aoshima, Zama, Japan

[73] Assignee: Canon Kabushiki Kaisha, Tokyo, Japan

[21] Appl. No.: 744,505

[22] Filed: Nov. 7, 1996

Related U.S. Application Data

[63] Continuation of Ser. No. 266,741, Jun. 28, 1994, abandoned.

[30] Foreign Application Priority Data

Jun. 30, 1993 [JP] Japan .................. 5-183167

[51] Int. Cl.$^6$ .................................. G03B 17/24
[52] U.S. Cl. .................................. 396/320
[58] Field of Search .................................. 396/310, 315, 396/316, 317, 319, 320

[56] References Cited

U.S. PATENT DOCUMENTS

| 4,834,306 | 5/1989 | Robertson et al. ............ 242/71.1 |
| 4,864,332 | 9/1989 | Harvey ............ 354/21 |
| 5,016,030 | 5/1991 | Dwyer et al. ............ 354/21 |

FOREIGN PATENT DOCUMENTS

| 267535 | 3/1990 | Japan . |
| 267536 | 3/1990 | Japan . |
| 3200131 | 9/1991 | Japan . |
| 3249632 | 11/1991 | Japan . |
| 4161939 | 6/1992 | Japan . |
| 4161945 | 6/1992 | Japan . |
| 4161946 | 6/1992 | Japan . |
| 4172431 | 6/1992 | Japan . |
| 9004203 | 4/1990 | WIPO . |

*Primary Examiner*—Howard B. Blankenship
*Attorney, Agent, or Firm*—Fitzpatrick, Cella, Harper & Scinto

[57] ABSTRACT

A camera or an apparatus adapted for a camera includes an operation unit for performing at least one of write and read operations of information with respect to an image recording medium, and an interlocking unit, interlocked with movement of an optical unit, for preventing the operation unit and the image recording medium from contacting each other at least while an image is being recorded in the image recording medium.

42 Claims, 8 Drawing Sheets

(STATE OF PHOTO-TAKING LENS INFINITY POSITION)

FIG. 1
(STATE OF PHOTO-TAKING WAITING)

FIG. 2
(STATE OF PHOTO-TAKING LENS INFINITY POSITION)

FIG. 3
(STATE OF PHOTO-TAKING LENS CLOSEST LIMIT DISTANCE POSITION)

FIG. 6
(STATE OF PHOTO-TAKING LENS COLLAPSE)

FIG. 7
(STATE OF PHOTO-TAKING PREPARATION IS COMPLETED)

FIG. 8
(STATE OF PHOTO-TAKING)

CAMERA WITH MAGNETIC HEAD PREVENTED FROM CONTACTING FILM DURING IMAGE RECORDING

This application is a continuation of application No. 08/266,741 filed Jun. 28, 1994, now abandoned.

BACKGROUND OF THE INVENTION

1. Field of the Invention

The present invention relates to an improvement in a camera using a film with a magnetic storage portion. This camera includes a magnetic head for performing writing information on and reading information from a magnetic storage portion of a film and an urging means for performing switching between a first state in which the magnetic head and the magnetic storage portion of the film are in tight contact with each other and a second state in which they are not.

2. Description of the Related Art

Recently, U.S. Pat. No. 4,864,332, for example, has proposed a camera using a film with a magnetic storage portion. In this camera, photo-taking information, such as a shutter speed, an aperture value, and a title, is written in this magnetic storage portion by a magnetic head, and read out when needed.

WO 90/04203 (PCT/US89/04343) has disclosed a camera in which a magnetic head is urged against a magnetic storage portion of a film to perform writing or reading of information only when the film is to be wound up to the next frame after an exposure operation.

Japanese Laid-Open Patent Application No. 3-200131 has disclosed a camera in which a magnetic head is switched between an urged state and a non-urged state with respect to a magnetic storage portion of a film by a dedicated motor.

Japanese Laid-Open Patent Application No. 4-161946 has disclosed a camera in which a magnetic head is interlocked with an operation member to be switched between a state in which a shutter release operation of the camera is inhibited and a state in which it is enabled, and the magnetic head is thereby switched between an urged state and a non-urged state with respect to a magnetic storage portion of a film.

Japanese Laid-Open Patent Application Nos. 4-161939 and 4-161945, for example, have disclosed a camera in which a magnetic head is interlocked with the opening/closing of a back-lid, the presence/absence of a film cartridge, detection of the leading portion of a film, or the like, and is thereby switched between an urged state and a non-urged state with respect to a magnetic storage portion of the film.

Japanese Laid-Open Patent Application No. 4-172431 has disclosed a camera in which a magnetic head is interlocked with the rotating direction of a film feed motor, and is thereby switched between an urged state and a non-urged state with respect to a magnetic storage portion of a film.

In addition, Japanese Laid-Open Patent Application No. 3-249632 has disclosed a photo-taking lens unit collapse camera in which a magnetic head can be switched between an urged state and a non-urged with respect to a magnetic storage portion of a film. This occurs when a photo-taking lens unit is collapsed, in a non-photo-taking state (in order to prevent fog which is caused if a film is kept urged for a long period of time in the non-photo-taking state), and the magnetic head is reliably urged when the photo-taking lens unit is not collapsed (in a photo-taking state).

The camera disclosed in Japanese Laid-Open Patent Application No. 3-200131, however, requires a dedicated actuator, resulting in an increased cost. In the techniques disclosed in, e.g., WO 90/04203 and Japanese Laid-Open Patent Application Nos. 4-161946, 4-161939, 4-161945, and 4-172431, on the other hand, it is not possible to switch the magnetic head to one of the urged and non-urged states freely at a desired timing with respect to the magnetic storage portion of a film. This undesirably limits the sequence of the camera.

Also, in the camera disclosed in Japanese Laid-Open Patent Application No. 3-249632, a film and the magnetic head are in tight contact each other in a photo-taking state. This makes it impossible to sustain the flatness of the film during exposure.

SUMMARY OF THE INVENTION

One aspect of the present invention is to provide a camera or an apparatus adapted for a camera, comprising operation means for performing at least one of writing information on and reading information from an image recording medium, and interlocking means, interlocked with movement of an optical unit, for preventing the operation means and the image recording medium from contacting each other at least while an image is being recorded in the image recording medium.

Other aspects of the present invention will become apparent from preferred embodiments to be presented below.

DETAILED DESCRIPTION OF THE PREFERRED EMBODIMENTS

Preferred embodiments of the present invention will be described below with reference to the accompanying drawings.

FIGS. 1 to 5 are cross-sectional views showing the arrangement of main parts of a camera according to the first embodiment of the present invention.

The most preferred example of a film cartridge for use in this embodiment is the film cartridge disclosed in, e.g., U.S.

Pat. No. 4,834,306. This film cartridge is so designed that a film is pushed outside the cartridge by rotation of a film supply spool arranged in the cartridge. With the use of the film cartridge of this type, it is possible to use an arrangement in which, after the film cartridge is loaded in a camera, a film is extracted outside the film cartridge by rotating the film supply spool of the cartridge by using a fork. The film is supplied until it is wound on a film takeup spool of the camera, and then the film is fed by the film takeup spool of the camera.

In this embodiment, a fork and a film takeup spool, which are to be described later, are designed so as to feed the film in the manner as described above by using a film feed mechanism which is well known in, e.g., Japanese Laid-Open Patent Application No. 2-67535 or 2-67356.

Figure 1:
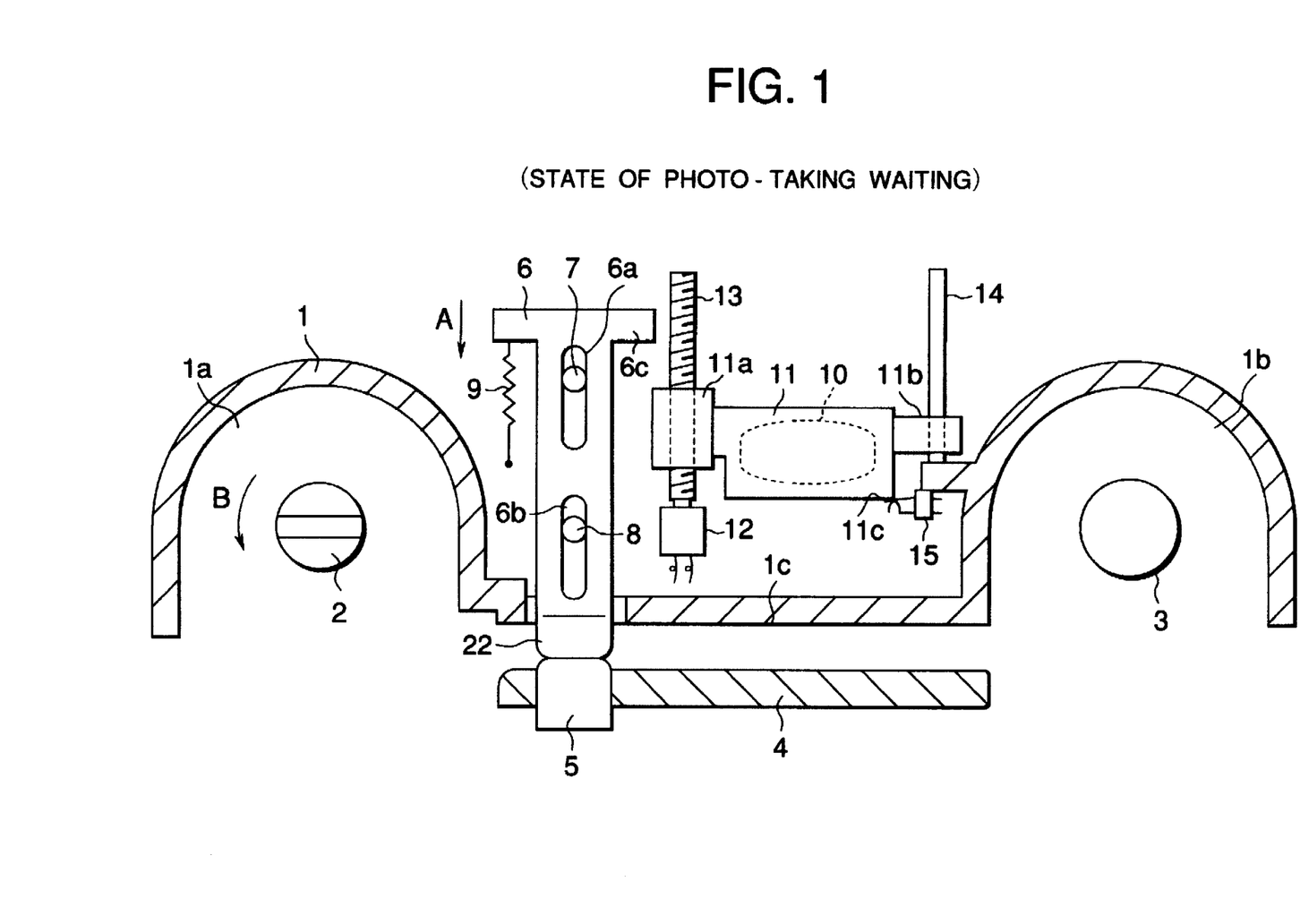
FIG. 1 is a cross-sectional view showing the arrangement of main parts of a camera in a state of photo-taking waiting according to the first embodiment of the present invention.

Referring to FIG. 1, a camera body 1 has a cartridge compartment 1a and a film takeup spool compartment 1b. The camera body 1 also includes a fork 2 and a film takeup spool 3 mentioned above. A film pressure plate 4 is attached to the camera body 1 or to a back-lid (not shown) with a predetermined distance held between the film pressure plate 4 and the film rail surface 1c of the camera body 1. A magnetic head 5 for performing reading and writing of information with respect to a magnetic storage portion (not shown) of a film 24, (to be described later) is fixed to the film pressure plate 4. A press lever 6 has elongated holes 6a and 6b in which shafts 7 and 8, respectively, of the camera body 1 are affixed by sliding. A spring 9 whose one end is connected to the press lever 6 and whose other end is connected to the camera body 1 biases the press lever 6 in the direction indicated by arrow A.

A pad 22 attached to the press lever 6 presses the film 24 (to be described later) to bring the magnetic storage portion of the film 24 into tight contact with the magnetic head 5.

A lens holder 11 for holding a photo-taking lens 10 includes an internal thread 11a. A feed screw 13 is 10 fixed to the output shaft of a motor 12 and engages with the internal thread 11a of the lens holder 11. A guide shaft 14 fixed to the camera body 1 slides in a guide hole 11b of the lens holder 11. Therefore, when the feed screw 13 is rotated by the motor 12, the lens holder 11 whose internal thread 11a engages with the thread of the feed screw 13 is driven in the direction of the arrow A or in the reverse direction depending on the rotating direction of the motor 12.

A detection switch 15 is attached to the camera body to detect the initial position of the photo-taking lens 10. A portion 11c of the lens holder 11 is so designed as to be able to abut against the contact piece of the detection switch 15. The detection switch 15 is turned on in the state shown in FIG. 1, and turned off in the states shown in FIGS. 2 and 3 in which the lens holder 11 is not in contact with the detection switch 15.

A portion 6c of the press lever 6 is in a position in which it can abut against the lens holder 11. The portion 6c is not in contact with the lens holder 11 in the state illustrated in FIG. 1. However, when the lens holder 11 is driven in the direction opposite to the direction of the arrow A from the state in FIG. 1, the portion 6c engages with the lens holder 11.

Figure 2:
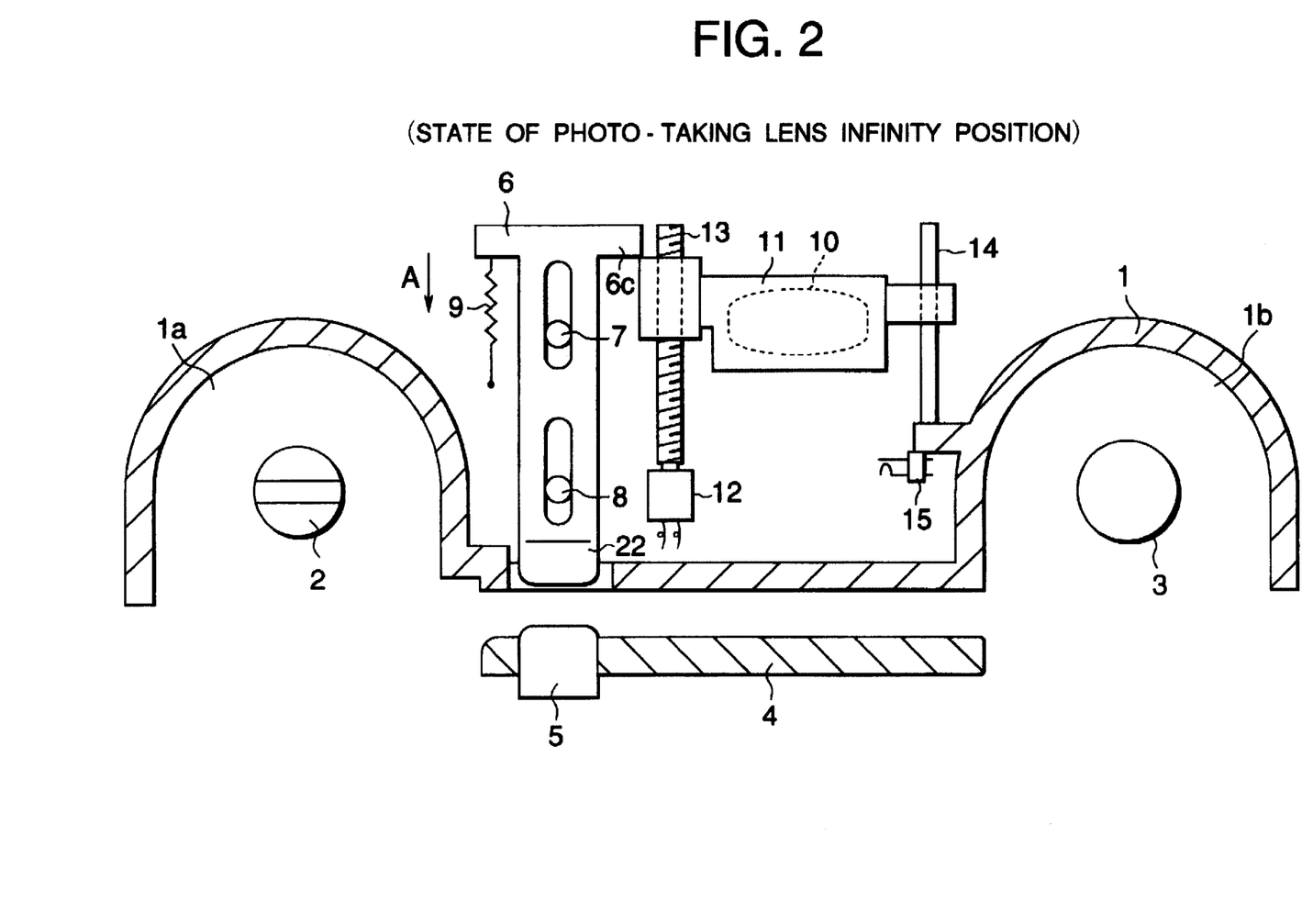
FIG. 2 is a cross-sectional view showing the arrangement of main parts of the camera in FIG. 1, in a state wherein the photo-taking lens is in the infinity position.
Figure 3:
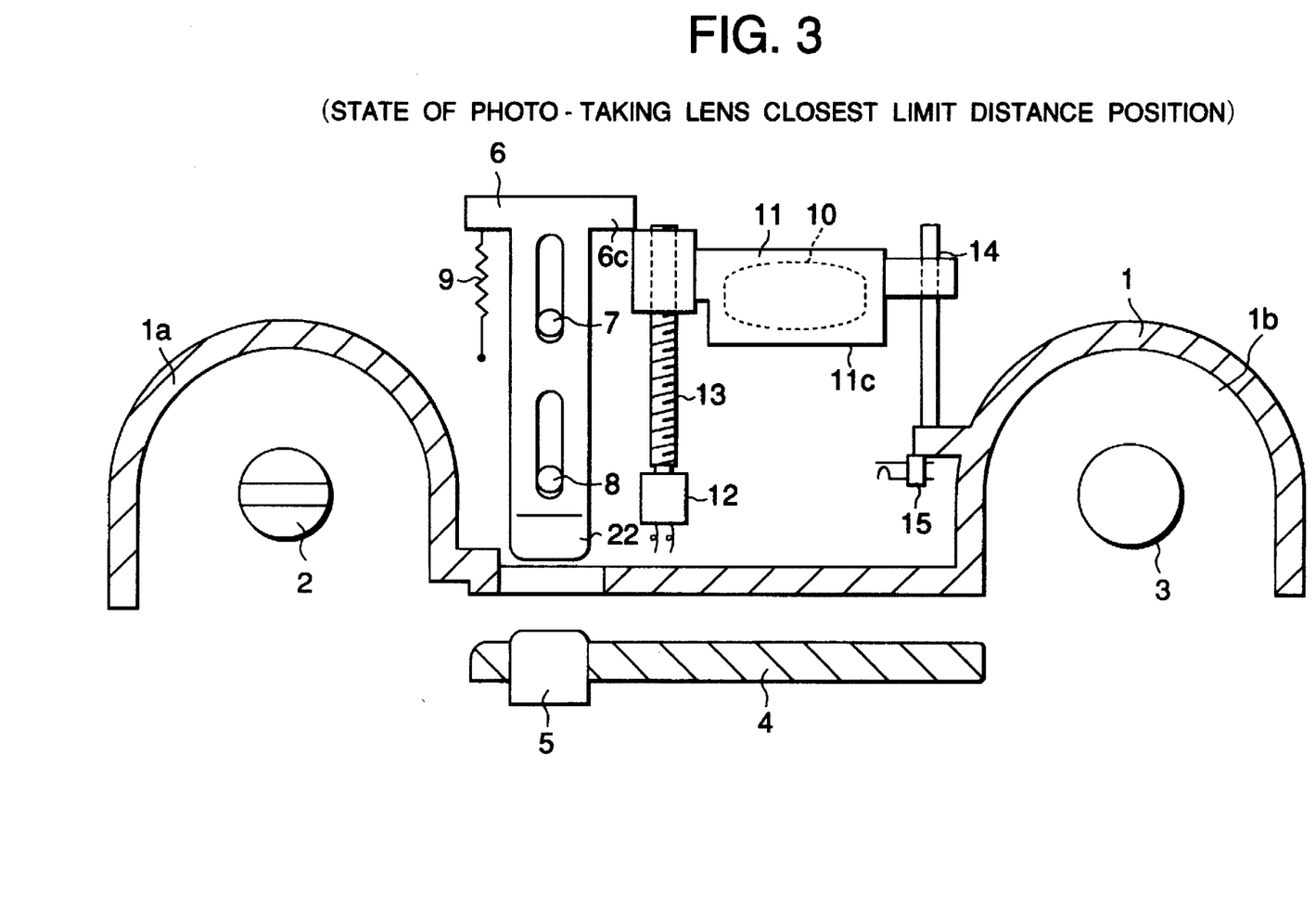
FIG. 3 is a cross-sectional view showing the arrangement of main parts of the camera in FIG. 1, in a state wherein the photo-taking lens is in the closest limit distance position.

FIG. 1 shows a state in which the photo-taking lens 10 is positioned outside a photo-taking enabling range, e.g., a state of waiting prior to performing a release operation of the camera. FIG. 2 shows a state in which the photo-taking lens 10 is positioned at one end of the photo-taking enabling range, e.g., a state in which the photo-taking lens 10 is focused on a position at an infinite distance. FIG. 3 shows a state in which the photo-taking lens 10 is positioned on the other end of the photo-taking enabling range, e.g., a state in which the photo-taking lens 10 is focused on a position at the closest limit distance.

While photo-taking is performed by the camera, i.e., while a shutter (not shown) is opened, the photo-taking lens 10 is within the range of the position shown in FIG. 2 to the position shown in FIG. 3.

In the state in FIG. 1, the pad 22 is pressed against the magnetic head 5 by the spring 9 attached to the press lever 6. When the motor 12 is driven to move the lens holder 11 in the direction opposite to the direction of the arrow A from the state shown in FIG. 1, the projecting portion 6c of the press lever 6 engages with the lens holder 11. Consequently, the press lever 6 is moved together with the lens holder 11 in the direction opposite to the direction of the arrow A against the biasing force of the spring 9. While the lens holder 11 is within the range from the position shown in FIG. 2 to the position shown in FIG. 3, the pad 22 is kept retracted outside the locus of movement of the film 24 (to be described later). Therefore, the pad 22 has no influence on the film 24.

Figure 4:
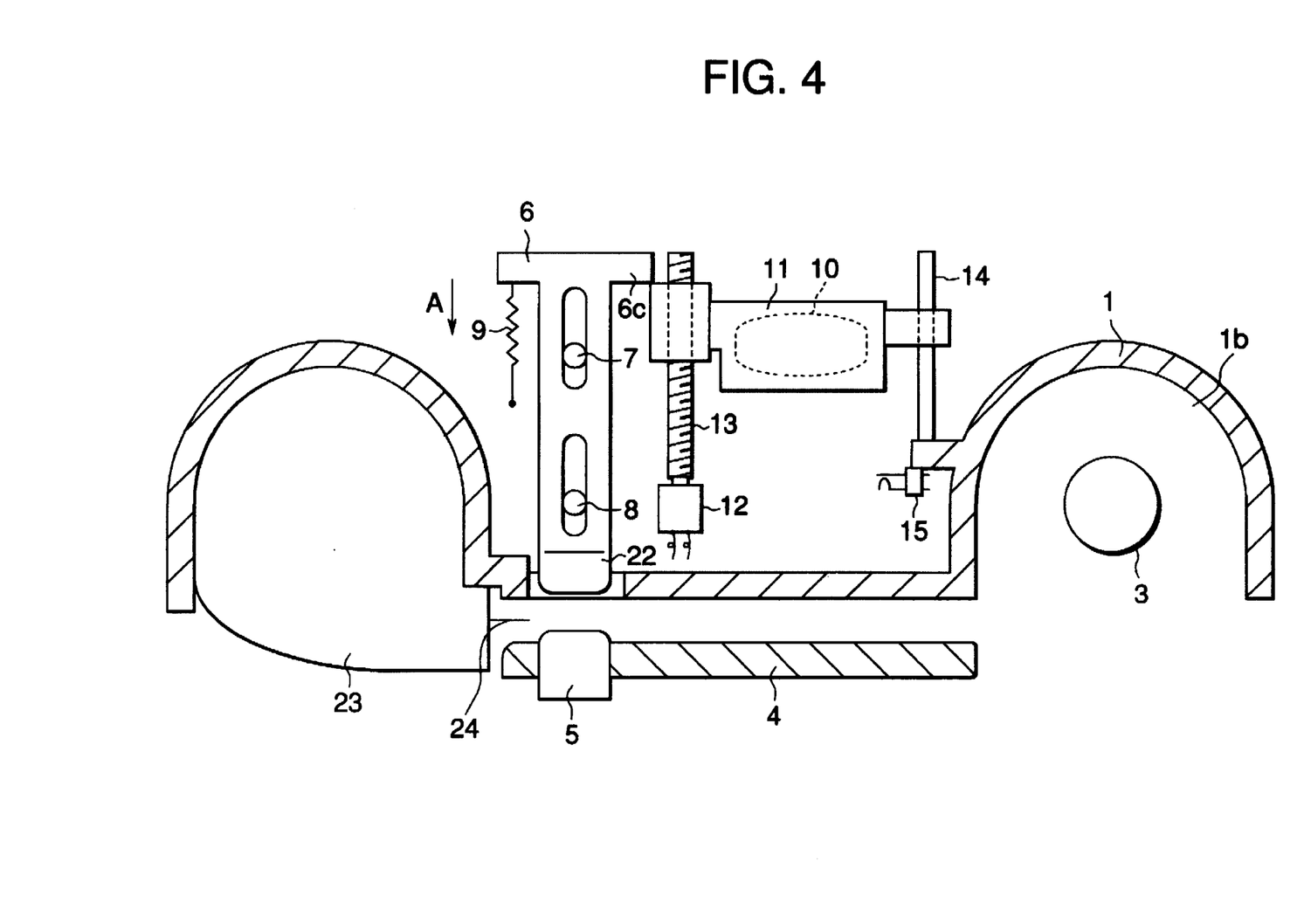
FIG. 4 is a cross-sectional view showing the arrangement of main parts of the camera in FIG. 1, in which the state immediately after a film cartridge is loaded in a cartridge compartment is illustrated.

FIG. 4 shows a state in which a film cartridge 23 (containing the film 24 with a magnetic storage portion) of the new type discussed earlier is loaded in the cartridge compartment 1a.

In this state, when a film supply spool (not shown) provided in the film cartridge 23 engages with the fork 2 to rotate the fork 2 counterclockwise (the direction indicated by an arrow B in FIG. 1), the film 24 is extracted outside the film cartridge 23. At this time, as in FIG. 4, the lens holder 11 is moved in the direction opposite to the direction of the arrow A from the position shown in FIG. 1 so as to retract the pad 22 together with the press lever 6 outside the locus of movement of the film, in order to prevent the leading portion of the film from being caught and buckled by the pad 22.

After the film is wound on the film takeup spool 3 by a means well known to those skilled in the art, the magnetic head 5 performs writing or reading of information with respect to the magnetic storage portion of the film 24. In this case, the lens holder 11 is moved, if necessary, to a position at which the detection switch 15 is turned on. Consequently, as in FIG. 5, the pad is pressed against the film by the biasing force of the spring 9 attached to the press lever 6, thereby urging the magnetic storage portion of the film 24 against the magnetic head 5.

Figure 5:
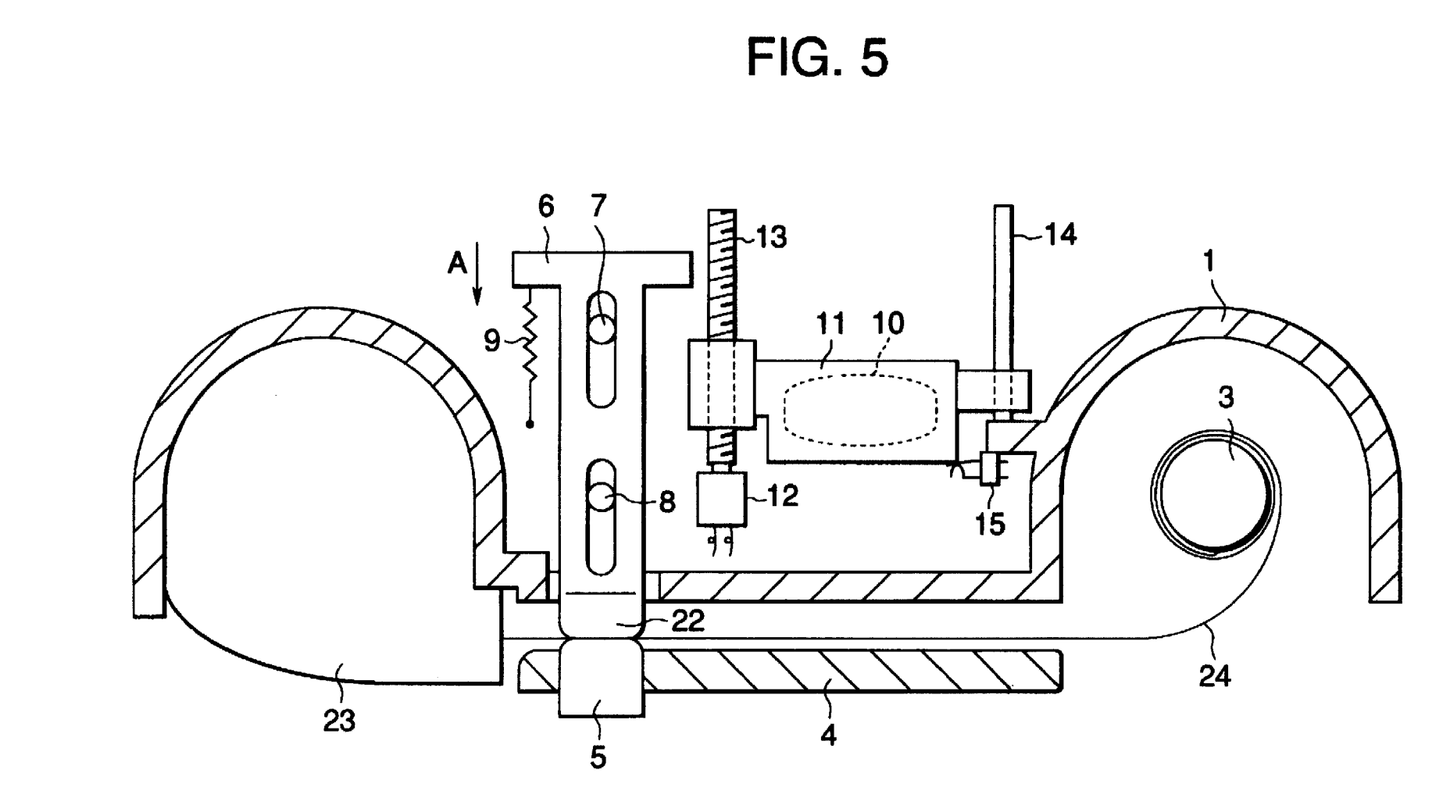
FIG. 5 is a cross-sectional view of the camera, in which a film is wound up from the state in FIG. 4 and a pad urges the film against a magnetic head.

This allows the magnetic head 5 to accurately read information from the magnetic storage portion of the film 24 or write information in it.

While photo-taking is performed (the shutter is opened), the photo-taking lens 10 is located between the position illustrated in FIG. 2 and the position illustrated in FIG. 3. Therefore, the pad 22 is retracted to a position at which it does not press the film 24. In this state, the pad 22 has no adverse effect on the flatness of the film.

That is, the above arrangement makes it possible to reliably set the film 24 and the magnetic head 5 in the non-urged state while the shutter is opened, and to freely perform switching between the urged state and the non-urged state at need in other cases. Consequently, a free camera sequence can be achieved without using any dedicated motor for switching the urged and non-urged states.

Figure 6:
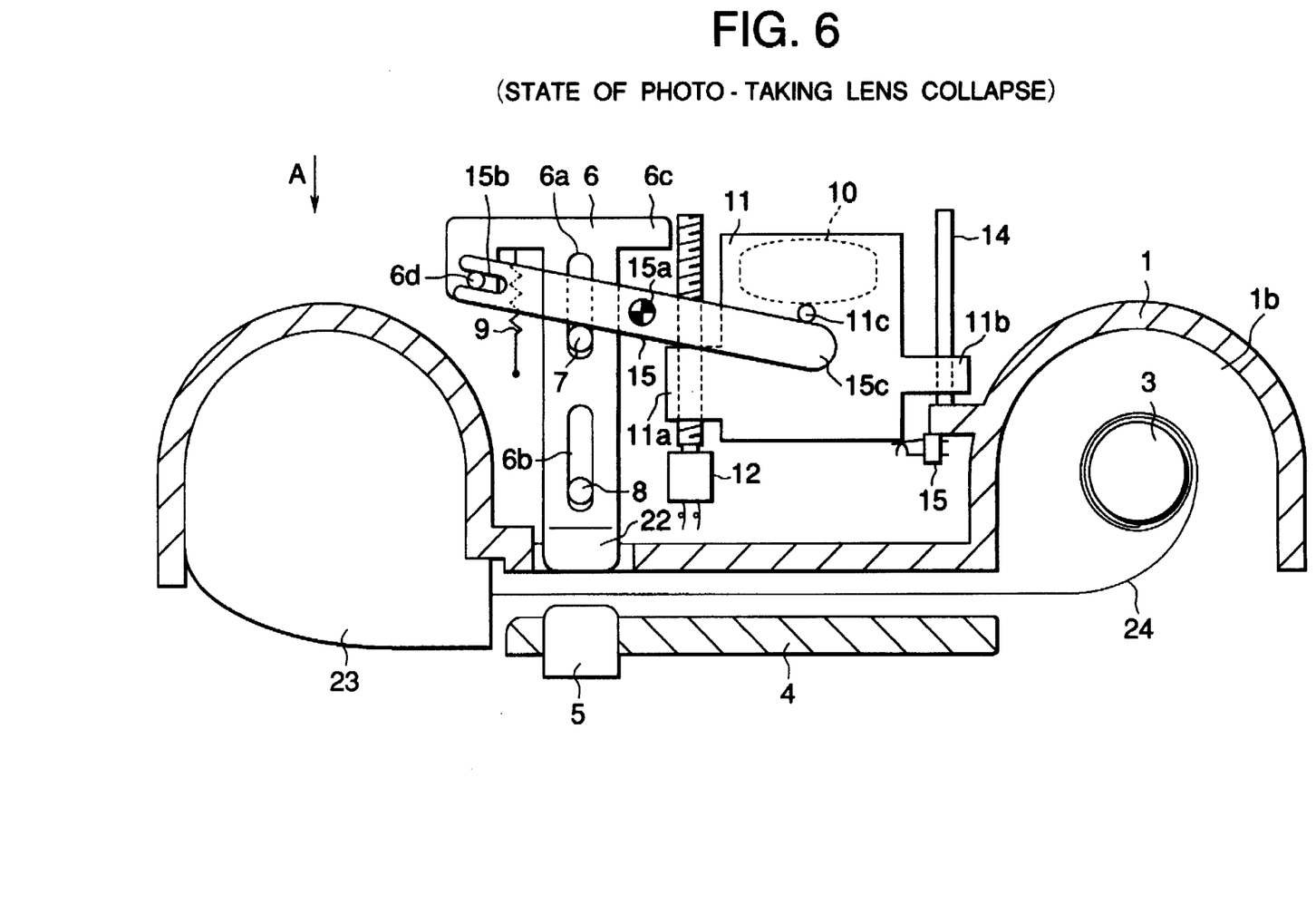
FIG. 6 is a cross-sectional view showing the arrangement of main parts of a camera in a state wherein the photo-taking lens is collapsed according to the second embodiment of the present invention.
Figure 7:
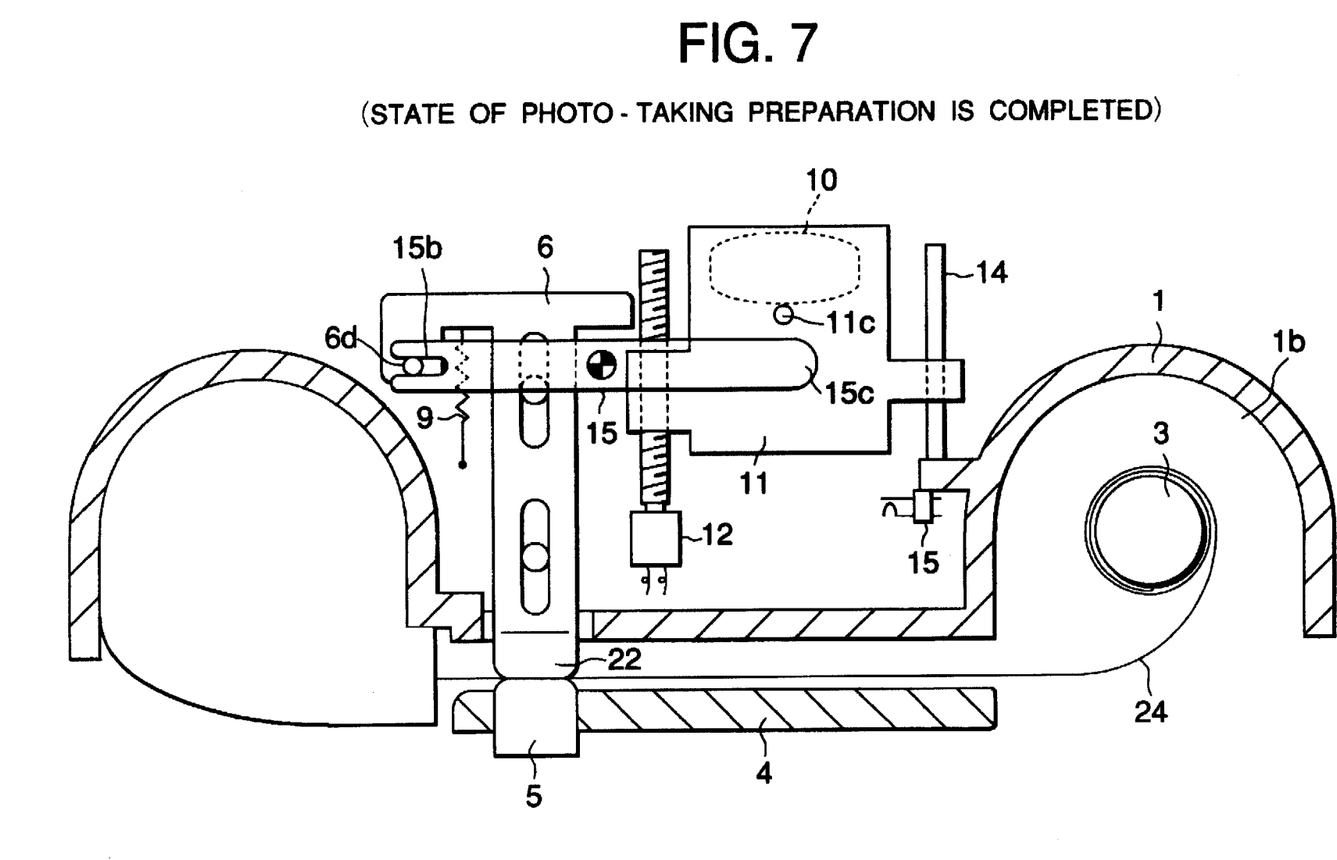
FIG. 7 is a cross-sectional view of the camera, in which the state in FIG. 6 is switched to a photo-taking preparation completed state.
Figure 8:
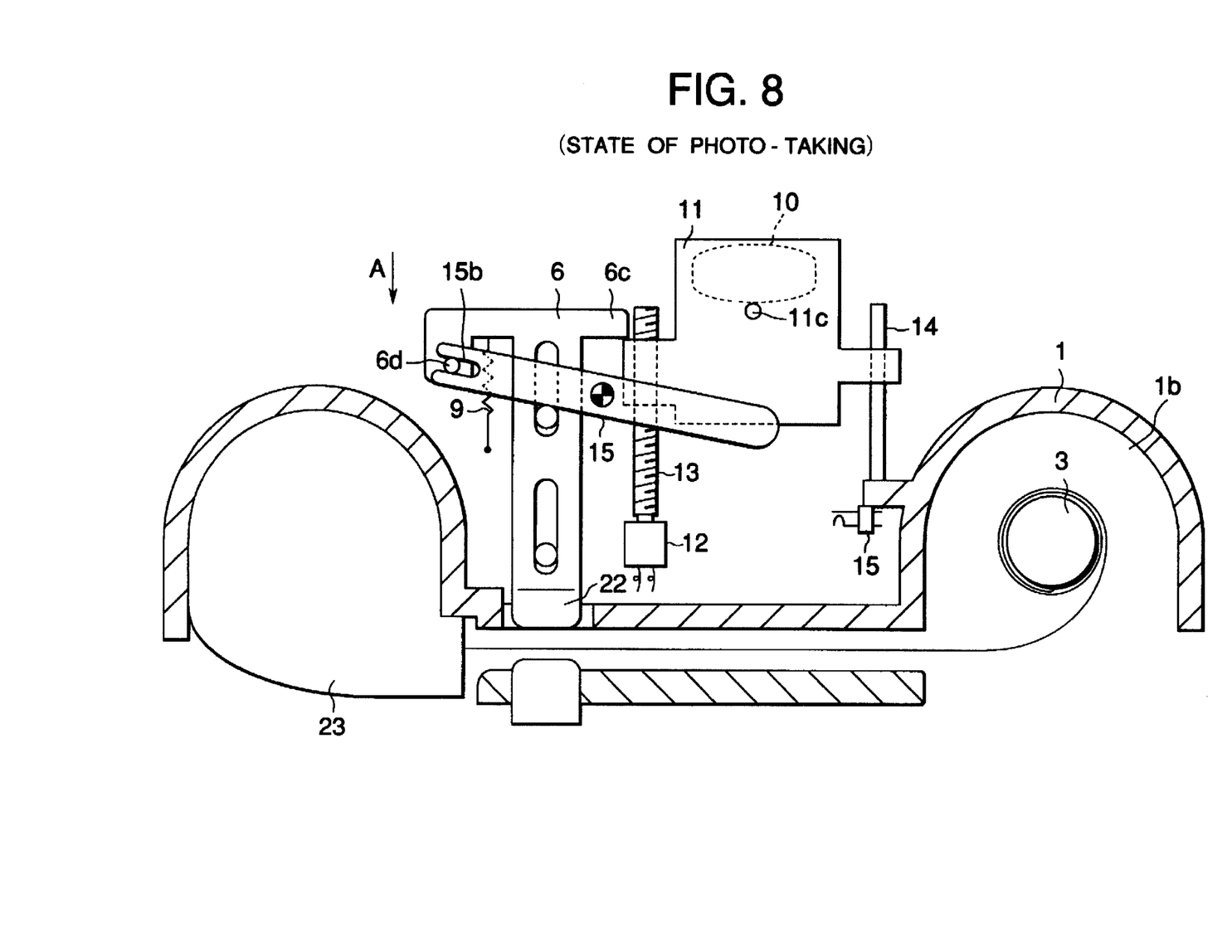
FIG. 8 is a cross-sectional view of the camera, in which the state in FIG. 7 is switched to a state of photo-taking.

FIGS. 6 to 8 are views showing the second embodiment of the present invention. In the second embodiment, the present invention is applied to a lens-barrel collapse type camera. FIGS. 6 to 8 are cross-sectional views showing the arrangement of main parts of the camera, in which the same reference numerals as in FIGS. 1 to 5 denote parts having the same functions.

In this embodiment, it is assumed that, when the camera is not in use, i.e., when a photo-taking lens (lens-barrel) is collapsed in a camera body, a magnetic head 5 does not perform writing or reading of information. When the photo-taking lens is collapsed, therefore, in order to prevent deformation (strain) of a film 24 owing to a long-time urged state between the film 24 and the magnetic head 5 from remaining, a pad 22 is retracted outside the locus of movement of the film, thereby setting the film 24 and the magnetic head 5 in a non-urged state.

FIG. 6 shows a state of photo-taking lens collapse. Referring to FIG. 6, an interlocking lever 15 is attached to a camera body 1 so as to be pivotal on a shaft 15a. One arm 15c of the interlocking lever 15 can abut against a projection 11c extending from a lens holder 11. The other arm of the interlocking lever 15 has a notch 15b which slides with a projection 6d expending from a press lever 6.

In the state illustrated in FIG. 6, the arm 15c is in contact with the projection 11c of the lens holder 11. Therefore, the pad 22 of the press lever 6 is located outside the locus of movement of the film through the engagement between the projection 6d and the notch 15b. For this reason, even if this state is held for a long period of time, the pad 22 does not apply any pressing force on the film 24. Since this prevents deformation of the film, no strain remains in it.

FIG. 7 is a view showing a photo-taking preparation completed state in which a main switch (not shown) is turned on to extend a photo-taking lens 10 and the lens holder 11.

In this state, the photo-taking lens 10 is located outside a photo-taking enabling range, and the projection 11c of the lens holder 11 is not in contact with the arm 15c of the interlocking lever 15. The pad 22 of the press lever 6 is biased by a spring 9 to press the film 24 against the magnetic head 5, urging the magnetic head 5 and the film 24 against each other. This permits the magnetic head 5 to perform writing and reading of information with respect to a magnetic storage portion of the film 24.

FIG. 8 is a view showing a state of photo-taking.

In this state, the photo-taking lens 10 is extended within the photo-taking enabling range, and the lens holder 11 engages with a portion 6c of the press lever 6 to move the press lever 6 and the pad 22 in the direction opposite to the direction of an arrow A in FIG. 7 against the biasing force of the spring 9. This moves the pad 22 outside the locus of movement of the film. Since the film 24 and the magnetic head 5 are not in tight contact with each other, the flatness of the film 24 is not disturbed. Consequently, an image to be exposed on the film 24 is not adversely affected.

In writing or reading information in or out from the magnetic storage portion of the film 24 by using the magnetic head 5, the photo-taking lens 10 and the lens holder 11 are moved, if necessary, to the positions illustrated in FIG. 7, thereby bringing the film 24 and the magnetic head 5 into tight contact with each other.

According to the first and second embodiments as discussed above, the urged and non-urged states between the film and the magnetic head are switched in association with the movement of the photo-taking lens. Consequently, the following effects can be obtained.

1) The manufacturing cost can be reduced since no dedicated actuator for switching the urged and non-urged states is necessary.

2) Since the urged and non-urged states can be switched at need, various camera sequences can be effected.

3) The magnetic head and the film are not in tight contact with each other during photo-taking. Therefore, the flatness of the film is not disturbed.

In each of the first and second embodiments, the pad 22 is moved to switch the urged and non-urged states between the film 24 and the magnetic head 5. However, it is also possible to switch the urged and non-urged states by directly moving the magnetic head 5, instead of the pad 22.

Note that the present invention can be practiced by combining the above embodiments or the technical elements of the embodiments in accordance with the intended use.

The present invention is also applicable to camera using an image recording medium other than a film.

Further, it is also possible to apply the present invention to an object other than the magnetic head, for example, a printing head (e.g. a ribbon, thermal head of a typewriter) which writes information in contacting recording medium as a writing information and/or reading information means.

It is also possible to apply the present invention to various forms of cameras, such as a single lens reflex camera, a lens shutter camera, a video camera, and to optical instruments other than cameras and other devices, and to units applied to these cameras, optical instruments, and devices.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera using a lens unit, the camera comprising:
    (A) an operation device that performs at least one of writing information to and reading information from an image recording medium; and
    (B) an interlocking device interlockable with and responsive to a focusing movement of the lens unit for preventing said operation device from contacting the image recording medium at least while an image is being recorded on the image recording medium.

2. A camera according to claim 1, wherein the image recording medium comprises a film.

3. A camera according to claim 1, wherein the image recording medium comprises a film with a magnetic storage portion.

4. A camera according to claim 1, wherein said operation device comprises a head for at least one of writing information to and reading information from the image recording medium upon contacting the image recording medium.

5. A camera according to claim 1, wherein said operation device comprises a magnetic head.

6. A camera according to claim 1, wherein the lens unit comprises a lens for focus adjustment.

7. A camera according to claim 1, wherein the lens unit comprises a photo-taking lens for focus adjustment.

8. A camera according to claim 1, wherein said interlocking device comprises means responsive to a state in which the lens unit is in a region for focus adjustment, for preventing said operation device and the image recording medium from contacting each other.

9. A camera according to claim 1, wherein said interlocking device comprises means for detecting a state in which the lens unit is in a region for focus adjustment, for preventing said operation device from contacting the image recording medium, and responsive to a state in which the lens unit is in a predetermined region outside the region for focus adjustment, for bringing said operation device and the image recording medium into contact with each other.

10. A camera according to claim 9, wherein the predetermined region comprises a photo-taking preparation completed initial region of the lens unit.

11. A camera according to claim 1, wherein said interlocking device comprises determination means responsive to a state in which the lens unit is in a first region, for preventing said operation device from contacting the image recording medium.

12. A camera according to claim 11, wherein the first region comprises a region in which the lens unit is positioned while the image is being recorded in the image recording medium.

13. A camera according to claim 12, wherein the first region comprises a region for storing the lens unit.

14. A camera according to claim 11, wherein the first region comprises a region for storing the lens unit.

15. A camera according to claim 11, wherein said interlocking device comprises means responsive to a state in which the lens unit is in a second region, for bringing said operation device and the image recording medium into contact with each other.

16. A camera according to claim 15, wherein the second region comprises a region in which the lens unit is not positioned while the image is being recorded in the image recording medium.

17. A camera according to claim 15, wherein the second region comprises a photo-taking preparation completed initial region of the lens unit.

18. A camera according to claim 1, wherein said interlocking device comprises means, mechanically interlocked with movement of the lens unit, for preventing said operation device and the image recording medium from contacting each other.

19. A camera according to claim 1, wherein said interlocking device comprises means for interlocking said operation device with a movement of the lens unit.

20. A camera according to claim 1, wherein said interlocking device comprises means for interlocking a member for urging the image recording medium against said operation device with a movement of the lens unit.

21. A camera comprising:
(A) an operation device that performs at least one of writing information on and reading information from an image recording medium;
(B) a movable lens unit; and
(C) an interlocking device interlockable with and responsive to a focusing movement of said lens unit for preventing said operation device from contacting the image recording medium at least while an image is being recorded in the image recording medium.

22. An apparatus for use with a camera using a lens unit, the apparatus comprising:
(A) an operation device that performs at least one of writing information to and reading information from an image recording medium; and
(B) an interlocking device interlockable with and responsive to a focusing movement of the lens unit for preventing said operation device from contacting the image recording medium at least while an image is being recorded on the image recording medium.

23. An apparatus according to claim 22, wherein the image recording medium comprises a film.

24. An apparatus according to claim 22, wherein the image recording medium comprises a film with a magnetic storage portion.

25. An apparatus according to claim 22, wherein said operation device comprises a head for at least one of writing information to and reading information from the image recording medium in contact with the image recording medium.

26. An apparatus according to claim 22, wherein said operation device comprises a magnetic head.

27. An apparatus according to claim 22, wherein the lens unit comprises a lens for focus adjustment.

28. An apparatus according to claim 22, wherein the lens unit comprises a photo-taking lens for focus adjustment.

29. An apparatus according to claim 22, wherein said interlocking device comprises means, interlocked with a state in which the lens unit is in a region for focus adjustment, for preventing said operation device and the image recording medium from contacting each other.

30. An apparatus according to claim 22, wherein said interlocking device comprises means responsive to a state in which the lens unit is in a region for focus adjustment, for preventing said operation device from contacting the image recording medium, and responsive to a state in which the lens unit is in a predetermined region outside the region for focus adjustment, for bringing said operation device and the image recording medium into contact with each other.

31. An apparatus according to claim 30, wherein the predetermined region comprises a photo-taking preparation completed initial region of the lens unit.

32. An apparatus according to claim 22, wherein said interlocking device comprises determination means for determining a state in which the lens unit is in a first region, for preventing said operation device and the image recording medium from contacting each other.

33. An apparatus according to claim 32, wherein the first region comprises a region in which the lens unit is positioned while the image is being recorded in the image recording medium.

34. An apparatus according to claim 33, wherein the first region comprises a region for storing the lens unit.

35. An apparatus according to claim 32, wherein the first region comprises a region for storing the lens unit.

36. An apparatus according to claim 32, wherein said interlocking device comprises means responsive to a state in which the lens unit is in a second region, for bringing said operation device and the image recording medium into contact with each other.

37. An apparatus according to claim 36, wherein the second region comprises a region in which the lens unit is not positioned while the image is being recorded in the image recording medium.

38. An apparatus according to claim 36, wherein the second region comprises a photo-taking preparation completed initial region of the lens unit.

39. An apparatus according to claim 22, wherein said interlocking device comprises, means mechanically interlocked with movement of the lens unit, for preventing said operation device and the image recording medium from contacting each other.

40. An apparatus according to claim 22, wherein said interlocking device comprises means for interlocking said operation device with a movement of the lens unit.

41. An apparatus according to claim 22, wherein said interlocking device comprises means for interlocking a member for urging the image recording medium against said operation device with a movement of the lens unit.

42. An apparatus adapted for use with a camera comprising:

(A) an operation device that performs at least one of writing information on and reading information from an image recording medium;

(B) a movable lens unit; and (C) an interlocking device interlockable with and responsive to a focusing movement of said lens unit for preventing said operation device from contacting the image recording medium at least while an image is being recorded on the image recording medium.

* * * * *

UNITED STATES PATENT AND TRADEMARK OFFICE
CERTIFICATE OF CORRECTION

PATENT NO. : 5,729,780
DATED : March 17, 1998
INVENTOR(S) : CHIKARA AOSHIMA It is certified that error appears in the above-identified patent and that said Letters Patent is hereby corrected as shown below:

<u>COLUMN 1</u>

Line 58, "non-urged" should read --non-urged state--.

Signed and Sealed this

First Day of September, 1998

*Attest:*

BRUCE LEHMAN

*Attesting Officer*   *Commissioner of Patents and Trademarks*